United States Patent [19]
Woodworth et al.

[11] Patent Number: 6,132,942
[45] Date of Patent: Oct. 17, 2000

[54] IMAGING BASE WITH BACKSIDE ROUGHNESS AT TWO FREQUENCIES

[75] Inventors: Charles B. Woodworth, Lenoir, N.C.; Thaddeus S. Gula, Rochester; Robert P. Bourdelais, Pittsford, both of N.Y.

[73] Assignee: Eastman Kodak Company, Rochester, N.Y.

[21] Appl. No.: 09/182,916

[22] Filed: Oct. 30, 1998

[51] Int. Cl.[7] .................................................. G03C 1/765
[52] U.S. Cl. .......................... 430/496; 430/536; 430/538; 430/950; 347/106; 503/227
[58] Field of Search .................................. 430/496, 536, 430/538, 950; 347/106; 503/227

[56] References Cited

U.S. PATENT DOCUMENTS

| | | | |
|---|---|---|---|
| 4,100,329 | 7/1978 | Neithardt, Jr. | 428/413 |
| 4,321,937 | 3/1982 | Littlehale . | |
| 4,610,924 | 9/1986 | Tamagawa et al. | 430/538 |
| 4,678,742 | 7/1987 | Tamagawa et al. | 430/950 |
| 4,870,001 | 9/1989 | Ashida . | |
| 4,912,333 | 3/1990 | Roberts et al. . | |
| 5,425,990 | 6/1995 | Blum et al. | 428/337 |
| 5,466,519 | 11/1995 | Shirakura et al. | 430/538 |
| 5,547,821 | 8/1996 | Melpolder et al. | 430/527 |
| 5,561,034 | 10/1996 | Desie et al. | 430/536 |
| 5,597,680 | 1/1997 | Wang et al. | 430/531 |
| 5,597,681 | 1/1997 | Anderson et al. | 430/523 |
| 5,800,973 | 9/1998 | Anderson et al. | 430/950 |
| 5,902,720 | 5/1999 | Haydeck et al. | 430/536 |
| 5,968,722 | 10/1999 | Lu et al. | 430/538 |

FOREIGN PATENT DOCUMENTS 0 926 545 A1  6/1999  European Pat. Off. .

*Primary Examiner*—Richard L. Schilling
*Attorney, Agent, or Firm*—Paul A. Leipold

[57] ABSTRACT

The invention relates to imaging elements comprising a back surface wherein said back surface has a low frequency roughness component having a roughness average of between 0.30 and 2.00 μm when measured with a low pass cutoff filter of 500 cycles/mm and a high frequency component having a roughness average of 0.001 to 0.05 μm when measured with a high pass cutoff filter of 500 cycles/mm.

17 Claims, 1 Drawing Sheet

IMAGING BASE WITH BACKSIDE ROUGHNESS AT TWO FREQUENCIES

FIELD OF THE INVENTION

This invention relates to imaging materials. In a preferred form it relates to base materials for photographic papers.

BACKGROUND OF THE INVENTION

It has been proposed in U.S. Pat. No. 5,244,861 to utilize biaxially oriented polypropylene laminated to cellulose photographic grade paper for use as a reflective receiver for thermal dye transfer imaging process. In this invention, low density polyethylene is melt extrusion coated onto the backside of the reflective receiver to balance the reflective receiver for curl, provide waterproofing to the paper, and provide the proper backside roughness for printer transport.

In the formation photographic papers, where an emulsion layer containing gel is coated onto the base paper that has been extrusion coated with low density polyethylene, there is a need to provide a base paper with improved resistance to curl. When the relative humidity is greater than 50% or less than 20%, as is common in the storage of photographic images, the curl of photographic paper interferes with the viewing of images. A solution to the photographic curl problem has been proposed in U.S. application Ser. No. 08/864,228 filed May 23, 1997, U.S. Pat. No. 5,902,720. In this invention, a mechanism to reduce curl in relative humidity greater than 50% or less than 20% is accomplished by applying a biaxially oriented polyolefin sheet to the backside of the paper base to balance the forces caused by the expansion and contraction of the emulsion layer in a relative humidity environment greater than 50% or less than 20%.

While the invention in U.S. application Ser. No. 08/864,228 filed May 23, 1997 does significantly improve the humidity curl of photographic paper, the typical surface roughness of the biaxially oriented sheets described in the invention that can be applied to the backside of the paper are smooth, with an roughness average or $R_a$ less than 0.23 $\mu$m. As the photographic images are processed in photoprocessing equipment (photographic printers, photographic processors, and photographic finishers), the photographic paper must be transported through many different types of equipment. In the formation of color paper it is known that the backside of the color paper is made sufficiently rough by casting polyethylene against a rough chilled roll. Photographic papers manufactured with the required backside roughness are very efficiently transported though photoprocessing equipment. Photographic papers with backside roughness less than 0.30 $\mu$m cannot be efficiently transported in the photoprocessing equipment, as many transport problems will occur. Transport problems such as scratching, machine jams, and poor print stacking will begin to occur with backside roughness less than 0.30 $\mu$m. It would be desirable if a backside surface could be formed with the strength properties to control curl and a surface roughness greater than 0.30 $\mu$m to allow for efficient photoprocessing.

Photographic papers that are smooth on the backside will tend to stick together as the smooth backside of the print is in contact with the smooth image layer as is the case when photographic prints in the final image format are stacked for efficient storage. There remains a need for photographic papers that will not block or stick together as prints are stored.

In the final image format, it is common for consumers to write personal information on the backside of the images with pens, pencil,s and other writing instruments. The ability of the backside of the image to accept post processing writing is referred to as writability. Writability of images is a desired consumer feature. Photographic papers that are smooth on the backside are more difficult to write on than photographic papers that are rough. Further, during the photofinishing process, it is common for critical information such as processing date and time to be printed on the backside of photographic paper. The printing of information during photofinishing is referred to as back marking. Poor back marking of images results in a loss of critical information. In U.S. application Ser. No. 08/998,357 filed Dec. 24, 1997, backside roughness of a biaxially oriented polymer sheet is described as being necessary for efficient transport through photofinishing equipment. While the invention does provide the required backside roughness for efficient conveyance in manufacturing and photoprocessing, the invention does not provide a significant improvement over prior art materials for photofinishing back marking and consumer writability. There remains a need for photographic papers that are sufficiently rough to allow for efficient transport though photofinishing equipment and also allow for photofinishing back marking and consumer writability.

During the manufacturing process for photographic papers, it is a requirement that silver halide emulsion coated paper be handled and transported in roll form. In roll form, the backside of the photographic paper is in contact with the silver halide image forming layer. If the roughness of the backside exceeds 2.54 $\mu$m, the image forming layer would begin to become embossed with the surface roughness pattern while in the roll form. Any customer perceived embossing of the image forming layer will significantly decrease the commercial value of the image forming layer. Furthermore, silver halide emulsions tend to be pressure sensitive. A sufficiently rough backside, in roll form, would begin to also destroy the commercial value of the image forming layer by developing the silver emulsion with pressure from the surface roughness of the backside. There remains a need for a photographic paper that has a backside roughness such that photographic paper can be conveniently wound and stored in roll format without damage but also allow writability and transport during photoprocessing.

PROBLEM TO BE SOLVED BY THE INVENTION

There is a continuing need for improvements in the backside properties to produce imaging elements that have improved transport in processing machines, as well as improved writability and photofinishing back marking. These imaging elements further need to not damage imaging layers when wound.

SUMMARY OF THE INVENTION

It is an object of the invention to overcome disadvantages of prior imaging members.

It is another object to provide an imaging member having a backside that exhibits good writability and also will transport well through processing machines.

It is a further object to provide imaging members that may be marked prior to processing and retain the markings after processing.

These and other objects of the invention are accomplished by an imaging element comprising a back surface wherein said back surface has a low frequency roughness component having a roughness average of between 0.30 and 2.00 $\mu$m when measured with a low pass cutoff filter of 500 cycles/ mm and a high frequency component having a roughness average of 0.001 to 0.05 μm when measured with a high pass cutoff filter of 500 cycles/mm.

ADVANTAGEOUS EFFECT OF THE INVENTION

The invention provides an improved base for the casting of photosensitive layers. It particularly provides an improved base for color photographic materials that have the required backside roughness for efficient transport though photoprocessing equipment, backside marking in photofinishing, and consumer writability.

DETAILED DESCRIPTION OF THE INVENTION

Figure 1:
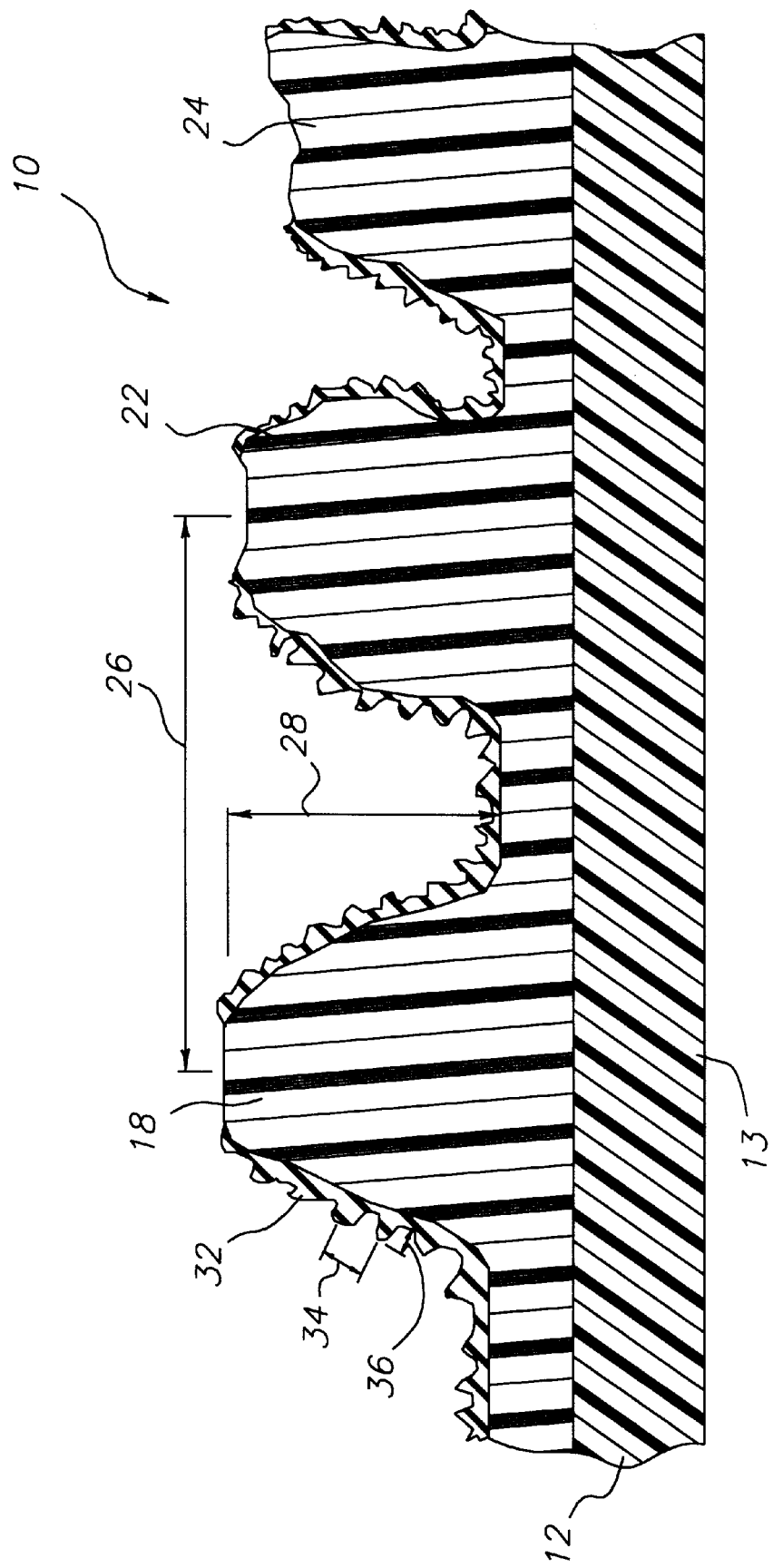
FIG. 1 is an illustration of the element of the invention exhibiting the two roughness frequencies.

The invention provides numerous advantages over prior imaging materials. The invention provides a surface that exhibits the ability to be marked, both by writing instruments such as pencils and pens, as well as to adhere and retain printing that is placed on the surface prior to chemical processing to develop a photographic element. The back surface of the imaging elements of the invention has the roughness frequency that meets the need for accurate and reliable transport of the imaging element in processing machines. Further, the preferred materials for forming the high frequency roughness are low in cost, reliable, compatible with photographic members, and result to low dust when the elements are cut or chopped. It is surprising that it has now been found that in order to optimize both printing and transporting properties of an imaging member, separate frequencies of backside roughness are required. These and other advantages will be apparent from the detailed description below.

The terms as used herein, "top", "upper", "emulsion side", and "face" mean the side or toward the side of a photographic member or imaging member bearing the imaging layers. The terms "bottom", "lower side", and "back" mean the side or toward the side of the photographic member or imaging member opposite from the side bearing the photosensitive imaging layers, developed image, or applied image.

In order to provide an imaging element with sufficient roughness to ensure efficient transport in photoprocessing equipment and allow for photoprocessing, back marking and consumer writability surprisingly backside roughness at two different frequencies were found to be necessary. The preferred frequency for efficient transport in imaging equipment has been found to be a low frequency roughness. This low frequency roughness determines the contact area with the many different types of materials that the photographic web contacts during photoprocessing. A lack of low frequency roughness would increase the contact area causing the coefficient friction between the photographic web and the machine components to exceed the design specification of many types of photoprocessing equipment. The preferred frequency for consumer writability and photoprocessing back marking has been found to be a high frequency roughness. The high frequency roughness allows for both pen and pencil writability by consumer but does not significantly impact transport of the web in photoprocessing equipment.

Since the distance between peaks for the high frequency roughness is very small compared to the low frequency roughness component, two different methods to create roughness were found to necessary. For the low frequency backside roughness on the biaxially oriented sheet of this invention, the most preferred method for adding roughness is by the use of incompatible block copolymers which do not mix during orientation. The most preferred method for adding high frequency roughness to the backside of the biaxially oriented sheet of this invention is by the formation of protuberances formed by the coalescence of a latex.

By combining the high frequency roughness and the low frequency roughness, an imaging element that can be both efficiently transported and provide superior consumer writability and photoprocessing back marking compared to prior imaging materials. Unexpectedly, it was found that providing an imaging element with just the high frequency roughness did not yield acceptable writability and back marking. In order for the high frequency roughness component to properly function, a low frequency roughness component is needed to protect the high frequency component against abrasion which is common during the manufacturing and photoprocessing of photographic paper or digital imaging paper. The low frequency roughness created high points that contact the equipment so low frequency areas in the valleys are not rubbed off.

The rough backside sheet, along with a biaxially oriented top sheet, is laminated to a suitable photographic base to create an imaging element base. Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density", is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength, and it becomes more susceptible to physical damage.

The total thickness of the composite sheet can range from 12 to 100 μm, preferably from 20 to 70 μm. Below 20 μm, the microvoided sheets may not be thick enough to minimize any inherent non-planarity in the support and would be more difficult to manufacture. At thickness higher than 70 μm, little improvement in either surface smoothness or mechanical properties are seen, and so there is little justification for the further increase in cost for extra materials.

The biaxially oriented sheets of the invention preferably have a water vapor permeability that is less than $0.85 \times 10^{-5}$ $g/mm^2/day/atm$. This allows faster emulsion hardening, as the laminated support of this invention greatly slows the rate of water vapor transmission from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 μm in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells and, thus, there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R)—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield nonuniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads, or inorganic particles such as clay, talc, barium sulfate, or calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma, or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred top biaxially oriented sheet of the invention where the exposed surface layer is adjacent to the imaging layer is as follows:

polyethylene exposed surface layer
polypropylene layer containing TiO$_2$
polypropylene microvoided layer
polypropylene bottom layer The sheet on the side of the base paper opposite to the emulsion layers or backside sheet may be any suitable sheet having the surface roughness used in this invention. The sheet may or may not be microvoided. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

The preferred backside biaxially oriented sheet is a biaxially oriented polyolefin sheet, most preferably a sheet of polyethylene or polypropylene. The thickness of the biaxially oriented sheet should be from 10 to 150 $\mu$m. Below 15 $\mu$m, the sheets may not be thick enough to minimize any inherent nonplanarity in the support and would be more difficult to manufacture. At thickness higher than 70 $\mu$m, little improvement in either surface smoothness or mechanical properties is seen, and so there is little justification for the further increase in cost for extra materials.

Suitable classes of thermoplastic polymers for the backside biaxially oriented sheet core and skin layers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins for the core and skin layers of the backside sheet include polypropylene, polyethylene, polymethylpentene, and mixtures thereof. Polyolefin copolymers, including copolymers of propylene and ethylene such as hexene, butene, and octene, are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof. Such polyesters are well known in the art and may be produced by well known techniques, e.g., those described in U.S. Pat. Nos. 2,465,319 and U.S. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the backside of the laminated base can be made with one or more layers of the same polymeric material, or it can be made with layers of different polymeric composition. For compatibility, an auxiliary layer can be used to promote adhesion of multiple layers.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The surface roughness of the backside sheet of this invention has two necessary surface roughness components to provide both efficient transport in photoprocessing equipment and writability and photoprocessing back marking. A combination of both low frequency roughness to provide efficient transport and high frequency roughness to provide a surface for printing and writing is preferred. High frequency surface roughness defined as having a spatial frequency greater than 500 cycles/mm with a median peak to valley height less than 1 μm. High frequency roughness is determining factor in photofinishing back marking where valuable information is printed on the backside of an image and consumer backside writability where a variety of writing instruments such as pens and pencils are used to mark the backside of an image. High frequency roughness is measured using a Park Scientific M-5 Atomic Force multi mode scanning probe microscope. Data collection was accomplished by frequency modulation intermittent contact scanning microscopy in topography mode. The tip was an ultralevel 4:1 aspect ratio with an approximate radius of 100 Angstroms.

Low frequency surface roughness of backside biaxially oriented film or Ra is a measure of relatively finely spaced surface irregularities such as those produced on the backside of prior art photographic materials by the casting of polyethylene against a rough chilled roll. The low frequency surface roughness measurement is a measure of the maximum allowable roughness height expressed in units of micrometers and by use of the symbol Ra. For the irregular profile of the backside of photographic materials of this invention, the average peak to valley height, which is the average of the vertical distances between the elevation of the highest peak and that of the lowest valley, is used. Low frequency surface roughness, that is, surface roughness that has spatial frequency between 200 and 500 cycles/mm with a median peak to valley height greater than 1 μm. Low frequency roughness is the determining factor in how efficiently the imaging element is transported through photofinishing equipment, digital printers, and manufacturing processes. Low frequency roughness is commonly measured by surface measurement device such as a Perthometer.

Biaxially oriented polyolefin sheets commonly used in the packaging industry are commonly melt extruded and then orientated in both directions (machine direction and cross direction) to give the sheet desired mechanical strength properties. The process of biaxially orientation generally creates a low frequency surface roughness of less than 0.23 μm. While the smooth surface has value in the packaging industry, use as a backside layer for photographic paper is limited. The preferred low frequency roughness for biaxially oriented sheets of this invention is between 0.30 and 2.00 μm. Laminated to the backside of the base paper, the biaxially oriented sheet must have a low frequency surface roughness greater than 0.30 μm to ensure efficient transport through the many types of photofinishing equipment that have been purchased and installed around the world. At a low frequency surface roughness less that 0.30 μm, transport through the photofinishing equipment becomes less efficient. At low frequency surface roughness greater than 2.54 μm, the surface would become too rough causing transport problems in photofinishing equipment, and the rough backside surface would begin to emboss the silver halide emulsion as the material is wound in rolls.

The structure of a preferred backside biaxially oriented sheet of this invention wherein the skin layer is on the bottom of the photographic element is as follows:

Solid polypropylene core
Copolymer of polyethylene and a terpolymer
of ethylene, propylene and butylene (skin layer)
Styrene butadiene methacrylate coating The low frequency surface roughness of the skin layer can be accomplished by introducing addenda into the bottommost skin layer. The addenda are introduced prior to extrusion of the sheet having the rough skin layer. The particle size of the addenda is preferably between 0.20 μm and 10 μm. At particle sizes less than 0.20 μm, the desired low frequency surface roughness can not be obtained. At particles sizes greater than 10 μm, the addenda begins to create unwanted surface voids during the biaxially orientation process that would be unacceptable in a photographic paper application and would begin to emboss the silver halide emulsion as the material is wound in rolls. The preferred addenda to be added to the bottommost skin layer, to create the desired backside roughness, comprises a material selected from the group of inorganic particulates consisting of titanium dioxide, silica, calcium carbonate, barium sulfate, alumina, kaolin, and mixtures thereof. The preferred addenda may also be crosslinked polymers beads using monomers from the group consisting of styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethyl-propane sulfonic acid, vinyl toluene, polystyrene, or poly(methyl methacrylate).

Addenda may also be added to the biaxially oriented backside sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet.

The most preferred method of creating the desired low frequency roughness on the bottommost skin layer of a biaxially oriented sheet is the use of incompatible block copolymers mixed with a matrix polymer such as polypropylene. Block copolymers of this invention are polymers containing long stretches of two or more monomeric units linked together by chemical valences in one single chain. During the biaxially orientation of the sheet, the incompatible block copolymers do not mix with each other or the matrix polymer, and as a result a bumpy, rough surface is created. During orientation of the biaxially oriented sheet of this invention, when the skin layer is oriented above the glass transition temperature of the matrix polymer, the incompatible block copolymers flow at different rates and create desired low frequency surface roughness and a lower surface gloss when compared to a typical biaxially oriented sheet containing homopolymers in the skin layer (which flow at the same rate and thus create a uniform smooth surface). The preferred block copolymers of this invention are mixtures of polyethylene and polypropylene. An example of a polymer formulation that provides the low frequency surface roughness of this invention is a copolymer of polyethylene and a terpolymer comprising ethylene, propylene, and butylene.

The final preferred method for increasing the low frequency surface roughness of smooth biaxially oriented sheets is embossing roughness into the sheet by use of a commercially available embossing equipment. Smooth films are transported through a nip that contains a nip roll and an impression roll. The impression roll under pressure and heat embosses the roll pattern onto the biaxially oriented smooth sheets. The surface roughness and pattern obtained during embossing is the result of the surface roughness and pattern on the embossing roll.

A random low frequency roughness pattern is preferred on the bottommost layer of the biaxially oriented sheet. A random pattern, or one that has no particular pattern, is preferred to an ordered pattern because the random pattern best simulates the appearance and texture of cellulose paper which adds to the commercial value of a photographic image. A random pattern on the bottommost skin layer will reduce the impact of the low frequency surface roughness transferring to the image side when compared to an ordered pattern. A transferred low frequency surface roughness pattern that is random is more difficult to detect than an ordered pattern.

The preferred high frequency roughness of biaxially oriented sheets of this invention is between 0.001 to 0.05 $\mu$m when measured with a high pass cutoff filter of 500 cycles/mm. High frequency roughness less than 0.0009 $\mu$m does not provide the required roughness for photofinishing back mark retention though wet chemistry processing of images. The high frequency roughness provides a nonuniform surface upon which the ink from the back mark, usually applied by a contact printer or ink jet printer, can adhere and be protected from the abrasion of photoprocessing. High frequency roughness greater than 0.060 $\mu$m does not provide the proper roughness for improved consumer writability with pens and pencils. Pens, much like the photoprocessing back mark, need a site for the pen ink to collect and dry. Pencils need a roughness to abrade the carbon from the pencil.

High frequency surface roughness of the backside sheet of this invention is accomplished by coating a separate layer on the skin which contains material that will produce the desired frequency of surface roughness, or by some combination of the two methods. Materials that will provide the desired high frequency of roughness include silicon dioxide, aluminum oxide, calcium carbonate, mica, kaolin, alumina, barium sulfate, titanium dioxide, and mixtures thereof. In addition, crosslinked polymer beads using styrene, butyl acrylamide, acrylonitrile, methyl methacrylate, ethylene glycol dimethacrylate, vinyl pryidine, vinyl acetate, methyl acrylate, vinyl benzyl chloride, vinylidene chloride, acrylic acid, divinyl benzene, acrylamido methyl-propane, and polysiloxane resin may be used to form high frequency surface roughness of this invention. All of these stated materials may be used in the skin layer or as a coated layer or in some combination thereof.

The preferred method by which the desired high frequency roughness may be created is through the application of a coated binder. The coated binder may be coated using a variety of methods known in the art to produce a thin, uniform coating. Examples of acceptable coating methods include gravure coating, air knife coating, application roll coating, or curtain coating. The coated binder may coated with or without a cross-linker that consists of a styrene acrylate, styrene butadiene methacrylate, styrene sulfonates, or hydroxy ethyl cellulose, or some mixture thereof. These binders may be used alone to achieve the desired high frequency roughness, or combined with any of the particulates described above to achieve said roughness. The preferred class of binder materials consists of an addition product of from about 30 to 78 mol % of an alkyl methacrylate wherein the alkyl group has from 3 to 8 carbon atoms, from about 2 to about 10 mol % of an alkali metal salt of an ethylenically unsaturated sulfonic acid and from 20 to about 65 mol % of a vinyl benzene, the polymer having a glass transition point of from 30 to 65° C. When properly formulated, coated, and dried, the coalescence of the latex produces a high frequency roughness in combination with or without colloidal silica that is particularly useful for back marking and photofinishing back printing retention.

An example of a preferred material to provide the high frequency roughness of this invention is styrene butadiene methacrylate coated onto a biaxially oriented skin layer consisting of a copolymer of polyethylene and a terpolymer comprising ethylene, propylene, and butylene. The styrene butadiene methacrylate is coated at 25 grams/m$^2$ using gravure/backing coating roll system. The styrene butadiene methacrylate coating is dried to a surface temperature of 55° C. The biaxially oriented sheet of this example contains a low frequency component from the biaxially copolymer formulation and a high frequency component from the coated layer of styrene butadiene methacrylate.

Illustrated in FIG. 1 is a schematic, cross-sectional view of a preferred biaxially oriented backside sheet 10 of this invention. The low frequency and high frequency roughness components are located on a biaxially oriented layer 12 which is joined to coextruded and oriented layer 13. The low frequency peaks 18, 22, and 24 are shown as integral with layer 2 and may be formed using the incompatible block copolymer technique or embossing technique discussed above. The high frequency layer 32 is applied as an overcoat. The low frequency component with peaks 18, 22, and 24 has a wavelength 26 and a peak height 28. The high frequency component 32 has a wavelength 34 and a peak height 36. The low frequency component 26 is much larger than the high frequency 34 component. The high frequency component 32 is shown as missing from peaks 18, 22, and 24, as it is often rubbed off the peaks during handling.

In order to successfully transport a photographic paper that contains a laminated biaxially oriented sheet with the desired surface roughness, on the opposite side of the image layer, an antistatic coating on the bottommost layer is preferred. The antistat coating may contain any known materials known in the art which are coated on photographic web materials to reduce static during the transport of photographic paper. The preferred surface resistivity of the antistat coat at 50% RH is less than $10^{13}$ ohm/square.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma, or corona discharge treatment to improve printability or adhesion.

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312; and 5,055,371.

The preferred support is a photographic grade cellulose fiber paper. When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them, followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheet.

During the lamination process, it is desirable to maintain control of the tension of the biaxially oriented sheet(s) in order to minimize curl in the resulting laminated support. For high humidity applications (>50% RH) and low humidity applications (<20% RH), it is desirable to laminate both a front side and backside film to keep curl to a minimum.

In one preferred embodiment, in order to produce photographic elements with a desirable photographic look and feel, it is preferable to use relatively thick paper supports (e.g., at least 120 $\mu$m thick, preferably from 120 to 250 $\mu$m thick) and relatively thin microvoided composite sheets (e.g., less than 50 $\mu$m thick, preferably from 20 to 50 $\mu$m thick, more preferably from 30 to 50 $\mu$m thick).

As used herein, the phrase "imaging element" is a material that may be used as a laminated support for the transfer of images to the support by techniques such as ink jet printing or thermal dye transfer, as well as a support for silver halide images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyvinyl alcohol, polycarbonate, polyvinyl pyrrolidone, starch, and methacrylate. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process,* Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure,* September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm.

The invention may be utilized with the materials disclosed in Research Disclosure, 40145 of September 1997. The invention is particularly suitable for use with the material color paper examples of sections XVI and XVII. The couplers of section II are also particularly suitable. The Magenta I couplers of section II, particularly M-7, M-10, M-11, and M-18 set forth below are particularly desirable.

M-7

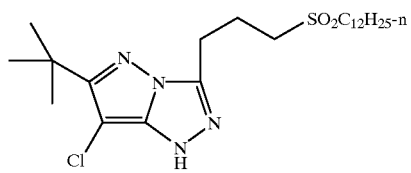

M-10

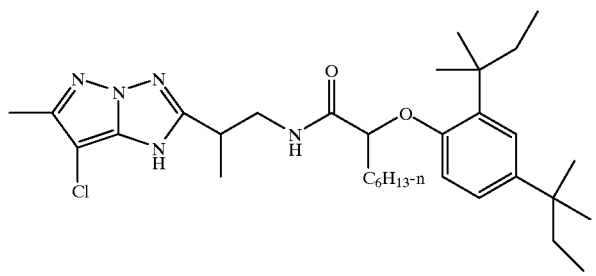

M-11

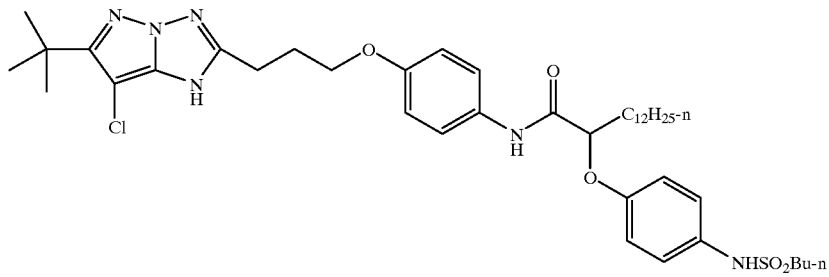

M-18

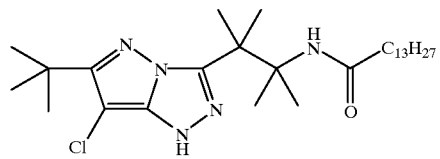

In the following Table, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, morphology and preparation. Emulsion preparation including hardeners, coating aids, addenda, etc. |
| 2 | I, II, IX, X, XI, XII, XIV, XV | |
| 3 | I, II, III, IX | |
| 3 | A & B | |
| 1 | III, IV | Chemical sensitization and spectral sensitization/ Desensitization |
| 2 | III, IV | |
| 3 | IV, V | |
| 1 | V | UV dyes, optical brighteners, luminescent dyes |
| 2 | V | |
| 3 | VI | |
| 1 | VI | Antifoggants and stabilizers |
| 2 | VI | |
| 3 | VII | |
| 1 | VIII | Absorbing and scattering materials; Antistatic layers; matting agents |
| 2 | VIII, XIII, XVI | |
| 3 | VIII, IX C & D | |
| 1 | VII | Image-couplers and image-modifying couplers; Dye stabilizers and hue modifiers |
| 2 | VII | |
| 3 | X | |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; Developing agents |
| 2 | XIX, XX, XXII | |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The laminated substrate of the invention may have copy restriction features incorporated such as disclosed in U.S. patent application Ser. No. 08/598,785 filed Feb. 8, 1996 and U.S. patent application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the backside to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or nonvisible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in *Research Disclosure* 37038 of February 1995.

Commercial Grade Paper of Examples

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

The following examples illustrate the practice of this invention. They are not intended to be exhaustive of all possible variations of the invention. Parts and percentages are by weight unless otherwise indicated.

EXAMPLES

Example 1

The following laminated photographic bases A-D were prepared by extrusion laminating a top biaxially oriented, microvoided polypropylene sheet to the emulsion side of a photographic grade cellulose paper base and various biaxially oriented sheets to the backside of the photographic grade cellulose paper base. Photographic bases A-D were prepared by melt extrusion lamination using 1924P Low Density Polyethylene (Eastman Chemical Co.) (an extrusion grade low density polyethylene with a density of 0.923 g/cm$^3$ and a melt index of 4.2) as the bonding layer.

The following top sheet was laminated to the face side of a photographic grade cellulose paper base for photographic bases A-D:
Top sheet: (Emulsion side)

OPPalyte 350 ASW (Mobil Chemical Co.), a composite sheet (31 micrometers thick) (d=0.68 g/cc) consisting of a microvoided and oriented polypropylene core (approximately 60% of the total sheet thickness), with a homopolymer non-microvoided oriented polypropylene layer on each side; the void initiating material used was poly(butylene terephthalate).

The following bottom biaxially oriented sheets were then laminated to the backside of the photographic grade cellulose paper base creating photographic bases A–D:
Photographic base A:

BICOR 70 MLT (Mobil Chemical Co.), a one-side matte finish, one-side treated biaxially oriented polypropylene sheet (18 μm thick) (d=0.90 g/cc) consisting of a solid oriented polypropylene layer and a skin layer of a block copolymer of polyethylene and a terpolymer comprising ethylene, propylene, and butylene. The skin layer was on the bottom, and the polyproylene layer was laminated to the paper.
Photographic base B:

BICOR 70 MLT (Mobil Chemical Co.), a one-side matte finish, one-side treated biaxially oriented polypropylene sheet (18 μm thick) (d=0.90 g/cc) consisting of a solid oriented polypropylene layer and a skin layer of a block copolymer of polyethylene and a terpolymer comprising ethylene, propylene and butylene. The skin layer was on the bottom, and the polyproylene layer was laminated to the paper.
Photographic base C:

BICOR LBW (Mobil Chemical Co.), a biaxially oriented, two-side corona discharge treated polypropylene sheet (18 μm thick) (d=0.9 g/cc) consisting of a single solid polypropylene layer.
Photographic paper base D:

BICOR LBW (Mobil Chemical Co.), a biaxially oriented, two-side corona discharge treated polypropylene sheet (18 μm thick) (d=0.9 g/cc) consisting of a single solid polypropylene layer.

A coating was then applied using a gravure coater to bases B and D to create the low frequency roughness surface to create the desired high frequency roughness. The coating consisted of an aqueous solution containing a sodium salt of styrene sulfonic acid. The coverage used was 25 mg/m$^2$ and then dried to achieve a final web temperature between 55° C., the resultant coalesced latex material produced the desired high frequency roughness pattern. In addition to the sodium salt of styrene sulfonic acid, aluminum modified colloidal silicon dioxide particles were added to the aqueous latex material at a concentration of 50 mg/m$^2$. This further enchanced the high frequency roughness.

Photographic bases A–D were light sensitive silver halide coated using coating format 1 detailed below:

| Coating Format 1 | Laydown mg/m$^2$ |
|---|---|
| Layer 1 Blue Sensitive Layer | |
| Gelatin | 1300 |
| Blue sensitive silver | 200 |
| Y-1 | 440 |
| ST-1 | 440 |
| S-1 | 190 |
| Layer 2 Interlayer | |
| Gelatin | 650 |
| SC-1 | 55 |
| S-1 | 160 |
| Layer 3 Green Sensitive | |
| Gelatin | 1100 |
| Green sensitive silver | 70 |
| M-1 | 270 |
| S-1 | 75 |
| S-2 | 32 |
| ST-2 | 20 |
| ST-3 | 165 |
| ST-4 | 530 |
| Layer 4 UV Interlayer | |
| Gelatin | 635 |
| UV-1 | 30 |
| UV-2 | 160 |
| SC-1 | 50 |
| S-3 | 30 |
| S-1 | 30 |
| Layer 5 Red Sensitive Layer | |
| Gelatin | 1200 |
| Red sensitive silver | 170 |
| C-1 | 365 |
| S-1 | 360 |
| UV-2 | 235 |
| S-4 | 30 |
| SC-1 | 3 |
| Layer 6 UV Overcoat | |
| Gelatin | 440 |
| UV-1 | 20 |
| UV-2 | 110 |
| SC-1 | 30 |
| S-3 | 20 |
| S-1 | 20 |
| Layer 7 SOC | |
| Gelatin | 490 |
| SC-1 | 17 |
| SiO$_2$ | 200 |
| Surfactant | 2 |

APPENDIX

Y-1

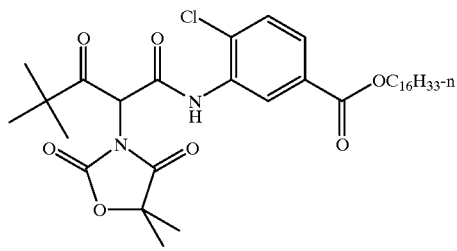

ST-1=N-tert-butylacrylamide/n-butyl acrylate copolymer (50:50)

S-1=dibutyl phthalate

SC-1

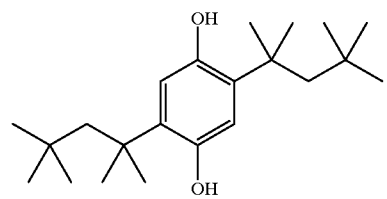

M-1

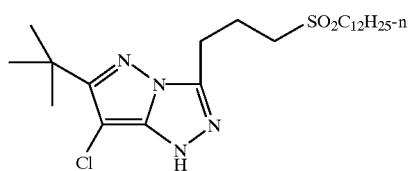

S-2=diundecyl phthalate

ST-2

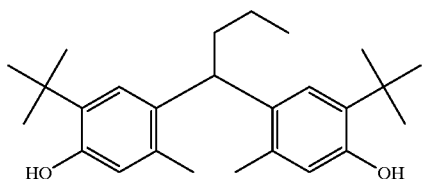

ST-3

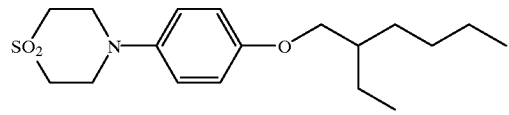

ST-4

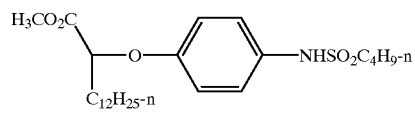

UV-1

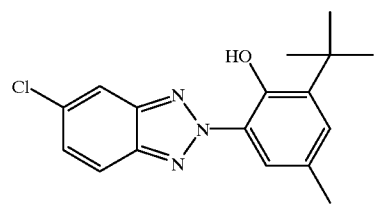

UV-2

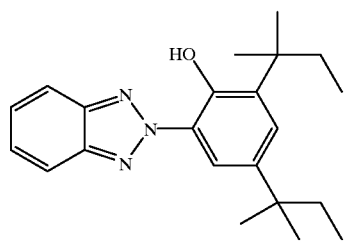

S-3=1,4-Cyclohexyldimethylene bis(2-ethylhexanoate)

C-1

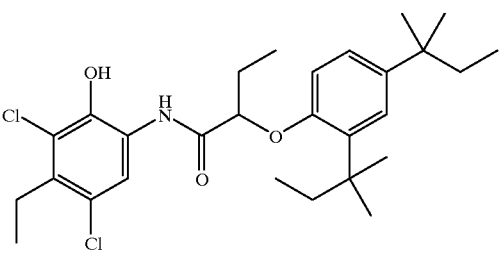

S-4=2-(2-Butoxyethoxy)ethyl acetate

Dye 1

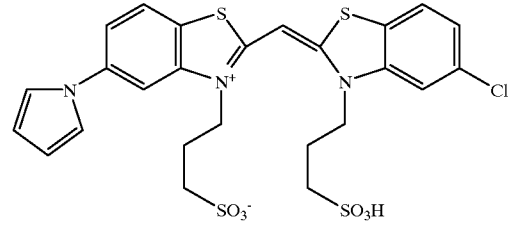

The low frequency roughness of the backside of each support variation was measured by TAYLOR-HOBSON Surtronic 3 with 2 $\mu$m diameter ball tip. The output Ra or "roughness average" from the TAYLOR-HOBSON is in units of micrometers and has a built-in, cutoff filter to reject all sizes above 0.25 $\mu$m. The roughness averages of 10 data points for each base variation is listed in Table 1. The high frequency roughness was measured using a Park Scientific M-5 Atomic Force multi mode scanning probe microscope. Data collection was accomplished by frequency modulation intermittent contact scanning microscopy in topography mode. The tip was an ultra level 4:1 aspect ratio with an approximate radius of 100 Angstroms. The ultralevel probe was provided by Park Scientific Company.

TABLE 1

| Base Variation | High Frequency Roughness (micrometers) | Low Frequency Roughness (micrometers) |
| --- | --- | --- |
| A | 0.002 | 0.51 |
| B (invention) | 0.010 | 0.51 |
| C | 0.002 | 0.15 |
| D | 0.010 | 0.15 |

The data in Table 1 show the significant improvement in backside low frequency roughness of bases A and B compared to the roughness of a typical biaxially oriented polyolefin sheet (bases C and D). The improvement in backside low frequency roughness for bases A and B, when compared to bases C and D, is significant because variations A and B have been modified to provide sufficient low frequency backside roughness that allowed for efficient transport thought the many types of photofinishing equipment that are commonly used to print, develop, and finish photographic images. The low frequency roughness was created during the orientation process for backside sheet by the use of incompatible block copolymers. The low frequency roughness improvement in bases A and B compared to bases C and D was also large enough to allow for efficient transport through digital printing hardware such as ink jet printers or thermal dye transfer printers. The low frequency roughness for bases C and D caused an undesirable increase in the coefficient of friction between the backside and the transport rollers, causing jams in the paper path and paper picking problems in sheet feed equipment that is common in ink jet and thermal dye transfer printers.

When testing these four base variations for writability, the writing instruments used included a No. 2 pencil, ballpoint pen, water based ink pen, and solvent based ink pen. It was found that variation B had the best overall performance when evaluated by typical consumers. Variations C and D were not writable with pencil. Variation A was only slightly writable with pencil.

Photofinishing back mark tests were done using a dot matrix printer that is commonly used in the photoprocessing trade, along with a printer ribbon which contained the ink material for transfer. When testing variations C and D, the resultant marks were faint, and easily removed with light abrasion of the surface. Variation A produced a back mark that would withstand light abrasion, but when run through a typical color paper processing machine, the back marking was removed. Variation B produced a legible back mark that was robust to physical abrasion, and also survived the color paper processing chemistry with minimal reduction in legibility.

By combining the high frequency roughness from the coalesced latex material and the low frequency roughness from the biaxially oriented block copolymer of polyethylene and a terpolymer comprising ethylene, propylene and butylene, a superior position can be achieved compared to prior art imaging supports. The imaging support of this invention has the required low frequency roughness to be efficiently transported through photofinishing equipment, retain critical photofinishing back mark data, and improved consumer writability compared to prior art imaging supports. Further, by combining the low frequency roughness component and the high frequency roughness component for the backside sheets of this invention, the high frequency roughness component was protected from abrasion in the photoprocessing operation and retained the desirable writability properties increasing the commercial value of the image.

The invention has been described in detail with particular reference to certain preferred embodiments thereof, but it will be understood that variations and modifications can be effected within the spirit and scope of the invention.

What is claimed is:

1. An imaging element comprising a back surface wherein said back surface has a low frequency roughness component having a roughness average of between 0.30 and 2.00 $\mu$m when measured with a low pass cutoff filter of 500 cycles/mm and a high frequency component having a roughness average of 0.001 to 0.05 $\mu$m when measured with a high pass cutoff filter of 500 cycles/mm.

2. The element of claim 1 wherein said element has a maximum profile excursion between the peak and valley of the surface of 5 to 10 $\mu$m.

3. The element of claim 1 wherein said element has between 400 and 600 peaks per cm exceeding a 0.10 $\mu$m cutoff.

4. The element of claim 1 wherein said high frequency component consists of the protuberances formed by the coalescence of a coating material.

5. The element of claim 1 wherein said low frequency component consists of protrusions formed by biaxial orientation of a mixture of polyethylene and a terpolymer of ethylene-propylene-butylene.

6. The element of claim 1 wherein said element comprises a laminated base material comprising an upper biaxially oriented polyolefin sheet adhesively adhered to a paper base and a lower biaxially oriented polymer adhered to the lower side of said paper base wherein the lower side of said lower biaxially oriented polymer has the specified roughness.

7. The element of claim 6 wherein said element has an upper layer that is adapted to receive inkjet printing.

8. The element of claim 4 wherein said coalescing material comprises a latex.

9. The element of claim 1 wherein said backside further comprises an antistatic material having a conductance of less than $10^{13}$ ohms per square.

10. A photographic element comprising at least one layer comprising photosensitive silver halide and a color coupler and a composite photographic support comprising a paper having bonded to its upper and lower surfaces biaxially oriented polyolefin sheets wherein the biaxially oriented sheet bonded to said lower paper surface comprises a back surface wherein said back surface has a low frequency roughness component having a roughness average of between 0.30 and 2.00 $\mu$m when measured with a low pass cutoff filter of 500 cycles/mm and a high frequency component having a roughness average of 0.001 to 0.05 $\mu$m when measured with a high pass cutoff filter of 500 cycles/mm.

11. The element of claim 10 wherein said element has a maximum profile excursion between the peak and valley of the surface of 5 to 10 $\mu$m.

12. The element of claim 10 wherein said element has between 400 and 600 peaks per cm exceeding a 0.10 μm cutoff.

13. The element of claim 10 wherein said high frequency component consists of the protuberances formed by the coalescence of a coating material.

14. The element of claim 10 wherein said low frequency component consists of protrusions formed by biaxial orientation of a mixture of polyethylene and a terpolymer of ethylene-propylene-butylene.

15. The element of claim 13 wherein said coalescing material comprises a latex.

16. The element of claim 1 wherein said backside further comprises an antistatic material having a conductance of less than $10^{13}$ ohms per square.

17. The element of claim 1 wherein said at least one layer comprising silver halide comprises a layer comprising red sensitive silver halide and cyan dye forming coupler, a layer of blue sensitive silver halide and yellow dye forming coupler, and a layer of green sensitive silver halide and magenta dye forming coupler.

* * * * *